United States Patent [19]
Hazell

[11] 3,761,039
[45] Sept. 25, 1973

[54] PNEUMATIC CARRIER SYSTEM
[75] Inventor: William J. Hazell, Golden, Colo.
[73] Assignee: Powers Regulator Company, Skokie, Ill.
[22] Filed: Mar. 9, 1972
[21] Appl. No.: 233,232

[52] U.S. Cl............................ 243/19, 243/1, 243/2, 243/38, 243/32
[51] Int. Cl............................................. B65g 51/32
[58] Field of Search ...................... 243/1, 5, 19, 38, 243/32, 2

[56] References Cited
UNITED STATES PATENTS
3,512,735   5/1970   Hallstrom ............................ 243/19
FOREIGN PATENTS OR APPLICATIONS
213,775   2/1961   Austria ................................. 243/19

Primary Examiner—Harvey C. Hornsby
Attorney—John L. Cline

[57] ABSTRACT

A pneumatic delivery system capable of transporting an information container around a sharp bend or corner without the need for conduit disposed on a large radius of curvature. A pneumatically movable capsule is positioned in a first conduit to carry the information container to the bend or corner where it leaves the capsule and enters a second conduit. Additionally a transfer station and an intermediate station are present which include a pneumatically movable capsule for transferring an information container from one deliver conduit to another and for withdrawing an information container from a delivery conduit respectively. Another aspect of the disclosure is a rotatable capsule positioned at the junction of two delivery conduits which receives an information container traveling in one conduit and is pneumatically rotated to a point where the information container can leave the capsule and travel through the second conduit.

5 Claims, 8 Drawing Figures

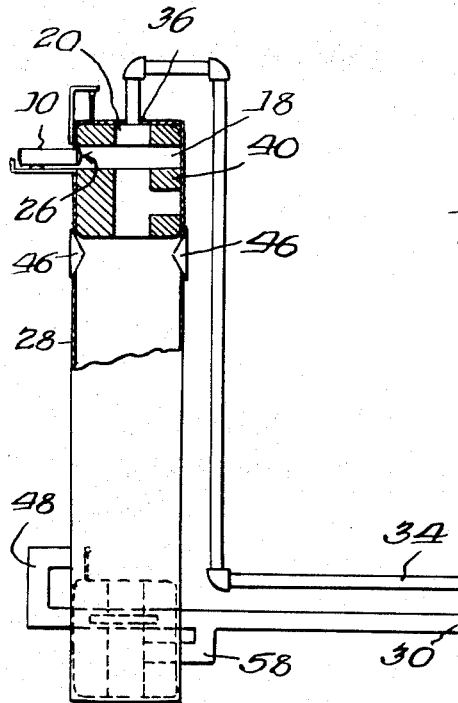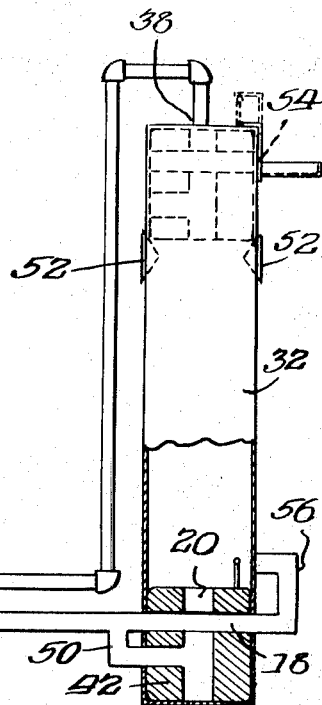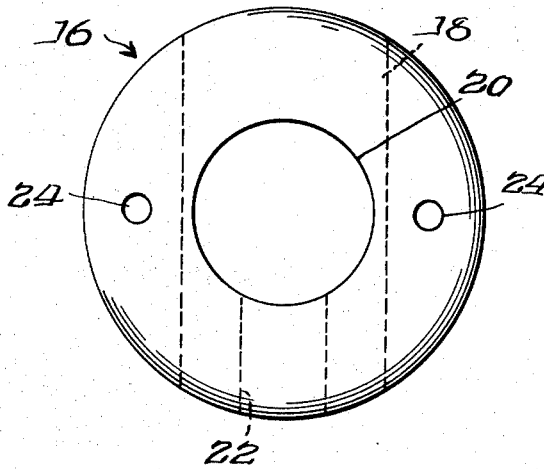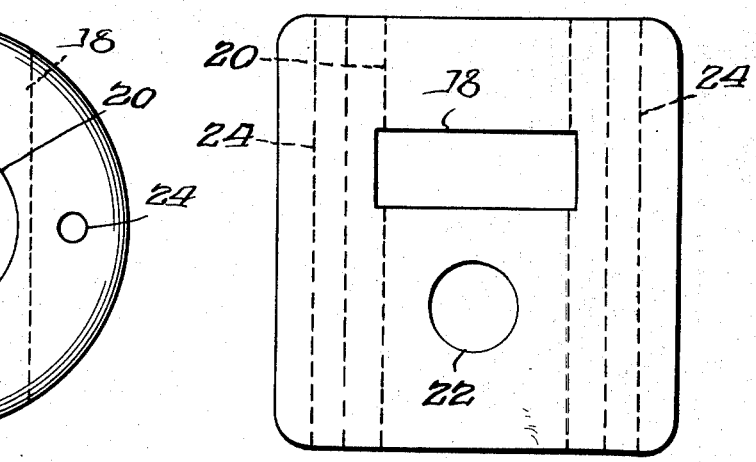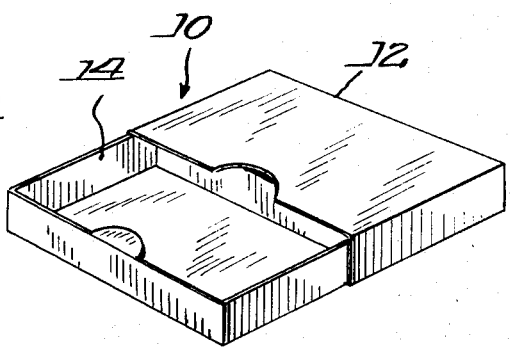

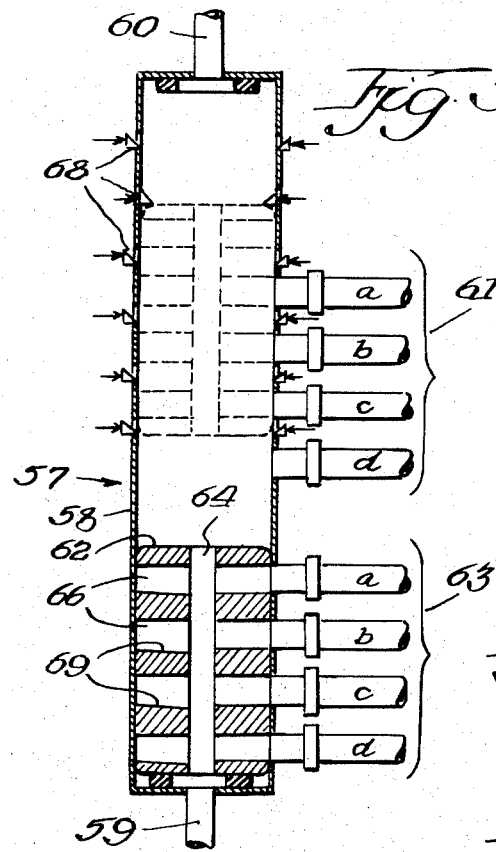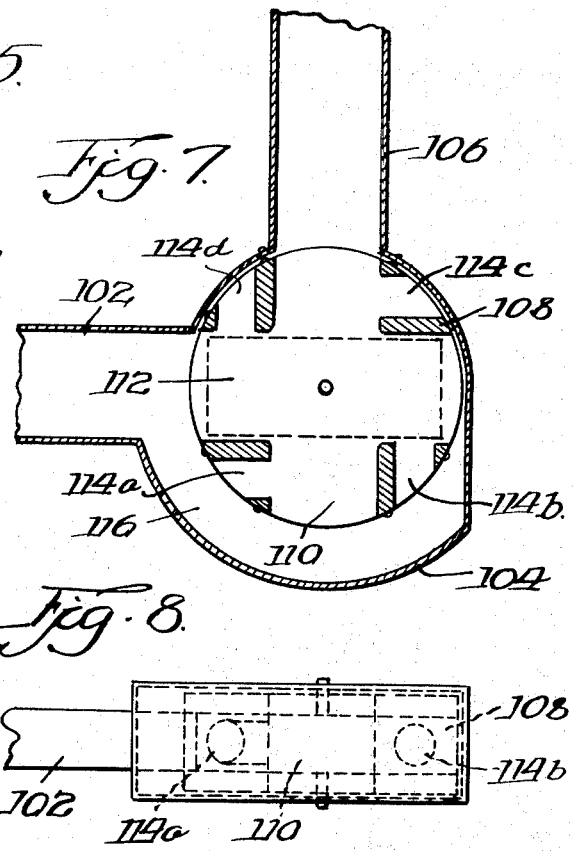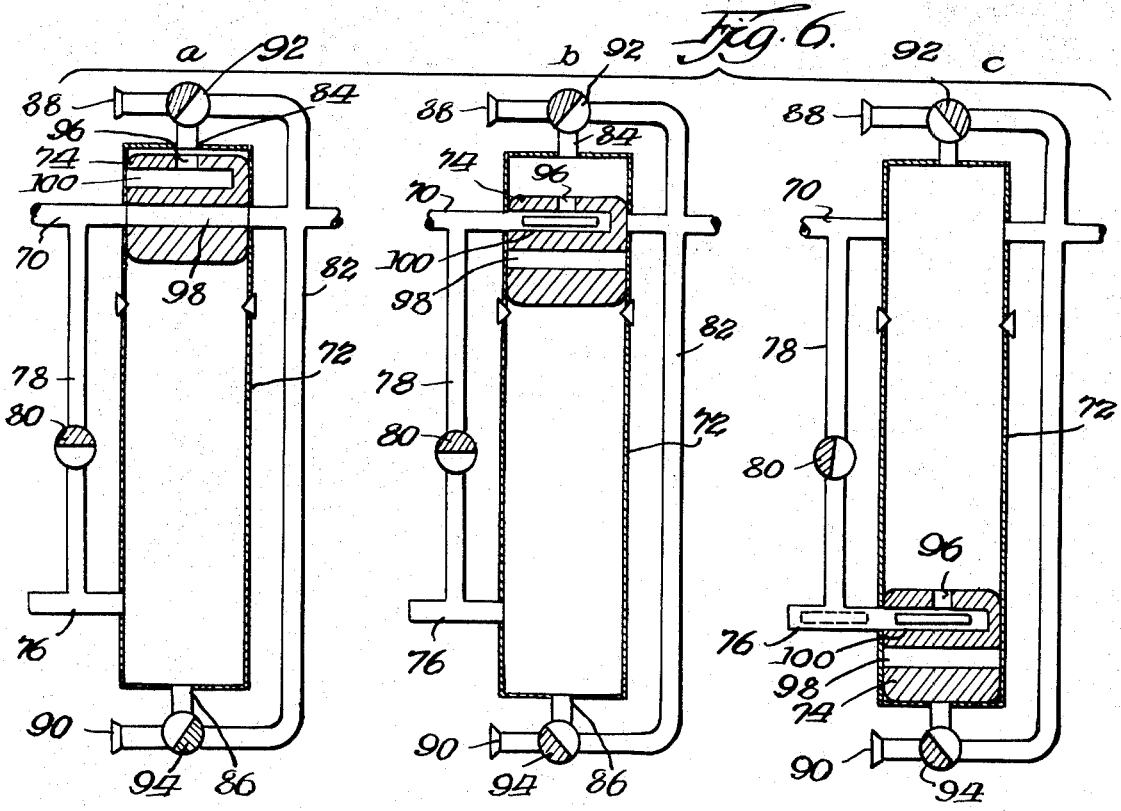

PNEUMATIC CARRIER SYSTEM

BACKGROUND OF THE INVENTION

This invention relates to the field of pneumatic delivery systems and in particular to pneumatic delivery systems which require an information container travelling in the delivery system to traverse sharp bends or corners.

Pneumatic delivery systems include delivery conduits through which information containers travel from a dispatch point to a point of withdrawal. The information containers are moved through the delivery conduit by the action of pneumatic pressure which is usually provided by a blower and/or vacuum system.

In many applications it would be desirable to dispose the delivery conduit in such a manner that it includes sharp bends. In the past, such a travel path has been impractical because the information container becomes jammed in the bend. If the conduit is made large enough to prevent jamming the pneumatic pressure at the bend is not sufficient to move the information container.

There are many applications for pneumatic delivery systems which traverse sharp bends or corners, but one illustration which is readily understood is a bank drive-in window. Ideally the depositor would place his deposit in an information container which would travel straight downwardly to below ground level, horizontally into the bank and then upwardly to the bank teller. Such a system requires two 90° bends and would be impossible with prior penumatic delivery systems. In the past this problem has been cured by disposing the conduit on a large radius of curvature such that the information container can traverse the bend. Obviously such a system requires a great deal of conduit and space.

SUMMARY OF THE INVENTION

This invention responds to the problems presented in the prior art by including a pneumatically movable capsule in a conduit to transport the information carrier to a point where a change of directions is desired. From that point the information container leaves the capsule and travels by itself in the normal pneumatic delivery system manner. Because the capsule has a larger cross-sectional area than the information container this system has increased vertical lift capability at a given pneumatic pressure.

When utilized in a drive-in window application a pair of capsules are utilized, one inside and one outside the bank. The information container travels between the capsules in an underground horizontal conduit.

The term "capsule" is used herein to denote a carrier different from that which contains the item to be transported. The term "information container" denotes the carrier which contained transported-item whether it is "information" in the form of a document or the like or is a physical object such as medicine or the like.

Additionally, a transfer station is presented whereat information containers may be transferred from one delivery conduit to another via a pneumatically operated capsule. Also an intermediate station is presented for intercepting an information container at a plurality of points.

Another aspect of this invention is a rotatable capsule disposed at the junction of two delivery conduits in which an information container may be rotated to be transferred from one delivery conduit to another.

BRIEF DESCRIPTION OF THE DRAWINGS

The features of this invention will be more apparent as described in the following detailed description read in conjunction with the figures in which:

FIG. 1 is a cross sectional schematic view of a pneumatic delivery system constructed in accordance with the principles of this invention.

FIG. 2 is a plan view of a pneumatic capsule which may be used in this invention.

FIG. 3 is a side view of the capsule shown in FIG. 2.

FIG. 4 is a perspective view of a rectangular information container which may be used in conjunction with this invention.

FIG. 5 is a cross-sectional schematic view of a transfer station constructed in accordance with this invention.

FIGS. 6 a, b, and c are cross-sectional schematic views of an intermediate station for use with this invention.

FIG. 7 is a cross-sectional view of a mechanism for rotating an information container constructed in accordance with the principles of this invention.

FIG. 8 is a side view of FIG. 7.

DESCRIPTION OF THE PREFERRED EMBODIMENTS

The preferred embodiments of this invention will be described as using a rectangular information container 10 as shown in FIG. 4 which includes an outer housing 12 and an inner tray 14. The tray 14 may be slid in and out of the outer housing 12 to hold any papers or the like which are to be transported. As used herein the term "information container" refers to the container shown in FIG. 4 to distinguish it from the capsule which will be described hereinafter. Although in many applications a rectangular information container 10 is desirable any suitable configuration may be used and there is no intention to limit this invention to a particular shape.

A suitable capsule for use in one form of this invention is shown in FIGS. 2 and 3. The capsule 16 is circular and includes a rectangular aperture 18 for receiving an information container 10. It also includes a cylindrical hole 20 for permitting the passage of air when an information container 10 is not placed in the receiving aperture 18. The capsule 16 also includes a cylindrical hole 22 for permitting pneumatic pressure to raise the capsule 16 when an information container 10 is disposed in the receiving aperture 18. The specific functions of the various apertures and holes will be fully described hereinafter. The capsule also includes a pair of guide holes 24 through which a pair of rods may pass to prevent the capsule 16 from rotating.

Referring to FIG. 1, a typical drive-in window installation is depicted by way of illustration and not limitation. An information container 10 is positioned at an opening 26 in a vertical conduit 28. The information container 10 is positioned for use by a depositor. It will ultimately be inserted through the opening 26, travel vertically downwardly through the conduit 28, rightwardly through a horizontal conduit 30 and finally vertically upwardly through a second vertical conduit 32 to be received by the teller inside the bank.

The pneumatic circuit shown in FIG. 1 includes piping 34 which communicates with the vertical conduits 28, 32 at 36 and 38 respectively. A blower 38 is bidirectional and may be operated to create a positive pressure in either of the vertical conduits 28, 32.

A capsule 40 is in a position to receive the information container 10 at the opening 26. Another capsule 42 is disposed at the lowermost point of the vertical conduit 32. Both capsules 40, 42 may be slidably positioned on rods (not shown) which pass through the aforementioned guide holes 24 to prevent the capsules 40, 42 from rotating in the conduits 28, 32. As depicted in FIG. 1 the blower is operating such that a positive pressure is produced in vertical conduit 28. The capsule 40 is held in a position to receive the information container 10 by a pair of detents 46. The pneumatic fluid, normally air, is passing through the cylindrical aperture 20 and consequently the capsule 40 is maintained at the top of the vertical conduit 28.

When the information container 10 is slid rightwardly into the receiving aperture 18 the cylindrical aperture 20 is blocked and a positive pressure now acts on the capsule 40 and information container 10 assembly. The pressure tends to force the assembly downwardly in the conduit 28. The detents 46 may be spring biased and thus overcome merely by the pneumatic pressure or they can be operated by a suitable mechanism which responds to the insertion of the information container 10. The pneumatic pressure carries the assembly of the capsule 40 and the information container 10 to the bottom of the conduit 28 as shown in dotted in FIG. 1. From this position at the bottom of vertical conduit 28 the pneumatic fluid passes through a bypass conduit 48 to act horizontally rightwardly on the information container 10.

As a result of the horizontal pressure the information container 10 is transported rightwardly through the horizontal conduit 30 until it is received in the receiving aperture 18 present in capsule 42. Prior to receipt of the information container 10 the air flow through the capsule 42 has been through the receiving aperture 18 and out the top of the vertical cylindrical aperture 20. Now that the information container 10 is present within the receiving aperture 18 that conduit is blocked and the air pressure acts through a by-pass 50 on the underside of the information carrier 10. In consequence of this vertical pressure the assembly consisting of the information carrier 10 and the capsule 42 rises vertically in the vertical conduit 32 past the detents 52 and into the position shown in dotted in the vertical conduit 32. At this point the teller may withdraw the information container 10 through an aperture 54 formed in the vertical conduit 32.

To return the information carrier 10 to the original position the teller merely reverses the direction in which the blower 39 is acting by a suitable switch (not shown) such that a positive pressure is present at the top of vertical chamber 32. The information container then returns to its original position by reversing its course from that described above. During the reverse path sequence a by-pass 56 communicating with the vertical conduit 32 is provided to force the information container 10 left-wardly through the horizontal conduit 30 in the same manner that by-pass 48 was utilized previously. Likewise a by-pass 58 communicating with a vertical conduit 28 operates to lift the assembly to its initial position in the same manner that the by-pass 50 operated previously.

Although the capsules 40, 42 have been illustrated as being cylindrical it is readily apparent that other shapes may be used as well. In fact if a multi-sided shape such as a square, pentagon or the like were used there would be no necessity for guide rods.

In many situations it is highly desirable to transfer an information container from one delivery conduit to another without the need for manual transfer. A transfer station which may be automatically operated is indicated generally at 57 in FIG. 5. A vertical conduit 58 includes pipes 59 and 60 for permitting the passage of pneumatic fluid. A plurality of delivery conduits 61, 63 communicate with the vertical conduit 58. A capsule 62 is disposed within the vertical conduit 58. The capsule 62 includes a centrally disposed axial hole 64 which permits an information container passing through the main line 70 would move from the left to right. Valve 94 is opened to the atmosphere and the valve 92 is closed to the atmosphere such that a positive pressure is maintained on the underside of the capsule 74. In this condition the opened ended aperture 98 is aligned with the main line 70 and an information carrier travelling therein would simply pass through the capsule 74.

If it is desired to transmit an information container to the intermediate station, valve 94 is closed to the atmosphere such that equal pressures are present on the top and bottom of the capsule 74 allowing it to drop to the position shown in FIG. 6b. At this point the closed end receiving aperture 100 communicates with the main line 70 and can receive an information container as shown in FIG. 6b.

To retrieve the information container valve 92 is opened to the atmosphere and valve 80 is opened to cause the capsule 74 to drop to the bottom of the vertical conduit 72 and force the information container out of the capsule 74 into the withdrawal station 76 as shown in FIG. 6c.

In many applications it is desirable to rotate an information container such that it turns a corner. In FIG. 7 a delivery conduit 102 communicates with a housing 104 and a second delivery conduit 106. The delivery conduits 102, 106 are disposed at right angles to one another. A capsule 108 is rotatably mounted within the housing 104. The capsule 108 includes two rectangular apertures 110 and 112 which communicate with one another and four circular apertures 114 a–d.

When there is no information container in the rectangular receiving aperture 112 the air flow passes from the delivery conduit 102 into the receiving chamber 112 out receiving chamber 110 into the passage of pneumatic fluid when the horizontal receiving apertures 66 do not contain an information container. A plurality of detents 68 are disposed along the vertical conduit 58 to limit the upward motion of the capsule 62.

In operation the transfer station would receive an incoming information container in one of the receiving apertures 66. A positive pneumatic pressure would be acting through the lowermost pipe 59 to raise the capsule 62 and information container assembly upwardly until it abuts one of the detents 68 which has been inserted into the vertical chamber 58. The notches 69 formed on the lower portion of the lefthand side of the receiving apertures 66 permit the pneumatic fluid to circulate behind the information container and force it out into the appropriate delivery conduit 61.

FIGS. 6 *a–c* illustrate an intermediate station for receiving and removing an information container from a main delivery conduit. In FIG. 6a the main delivery conduit is illustrated at 70 in communication with a vertical conduit 72. A capsule 74 is disposed within the vertical conduit 72. A withdrawal station 76 communicates with the vertical conduit 72 and with the main line 70 through a conduit 78 and a valve 80. Another conduit 82 communicates with both ends of the vertical chamber 72 at 84 and 86 and with the atmosphere at 88 and 90. A pair of valves 92 and 94 control the flow of pneumatic fluid through the conduit 82 and the vertical conduit 72.

The capsule 74 includes an axial aperture 96, a rectangular open-ended aperture 98 and a rectangular closed-end aperture 100 which communicates with the axial aperture 96.

As shown in FIG. 6a the high pressure side of the main line 70 is on the left of the vertical conduit 72 such that delivery conduit 106. However, when an information container arrives at the receiving aperture 112 the path of pneumatic fluid flow is blocked. Consequently, the air flow passes downwardly as shown in FIG. 7 into a space between the housing 104 and the rotatable capsule 108 indicated at 116 and produces a positive pressure acting through the circular aperture 114b and rectangular aperture 110. The positive pressure present at 114b causes the capsule 108 to rotate into a position where the information container will be aligned with the delivery conduit 106. At that point the information container will continue in delivery conduit 106.

What is claimed is:

1. A pneumatic transport system comprising:
a first conduit;
a second conduit communicating with said first conduit;
means for creating a pressure differential in said conduits;
a capsule disposed within said first conduit for movement between a dispatch station and said second conduit;
said capsule including means for receiving an information container at said dispatch station and conduit means in said capsule for causing said pressure differential to act on said capsule when said information container is placed in said capsule at said dispatch station for moving said capsule and said information container to said second conduit; and
means for causing said pressure differential to act on said information container at said second conduit for moving said information container out of said capsule for transport through said second conduit.

2. A pneumatic delivery system comprising:
first and second conduits each of which includes an opening for dispatching and withdrawing an information container;
a third conduit angularly communicating with said first and second conduits;
means for creating pneumatic pressure in said conduits;
first and second capsules disposed in said first and second conduits respectively for movement between said first and second openings and said third conduit;
said capsules including means for receiving said information container and conduit means for causing said pressure to act on said capsule when said information container is disposed in said receiving means whereby an information container may be dispatched in said first capsule at said first opening to be transported with said first capsule to said third conduit, through said third conduit to said second capsule and thereafter with said second capsule to said second opening for withdrawal from said second opening.

3. An intermediate station for use in a pneumatic delivery system comprising:
a conduit communicating with a delivery conduit of said system;
a capsule disposed within said conduit including means for permitting the passage of an information container through said capsule as said container travels in said delivery conduit and means in said capsule for receiving an information container travelling in said delivery conduit for delivery to said intermediate station.

4. The station set forth in claim 3 further comprising:
conduit means communicating with said conduit and said delivery conduit for pneumatically moving said capsule in said conduit.

5. A transfer device for transferring information containers from one pneumatic delivery line to another which comprises:
a transfer conduit;
a plurality of delivery conduits communicating with said transfer conduit;
a capsule disposed within said transfer conduit, said capsule including means for receiving an information container and conduit means for causing pneuamitc pressure to act on said capsule when said information container is disposed in said receiving means; and
means for moving said capsule such that said receiving means may be selectively disposed in communication with said delivery conduits to transfer an information container from one delivery conduit to another.

* * * * *

UNITED STATES PATENT OFFICE
CERTIFICATE OF CORRECTION

Patent No. 3,761,039          Dated September 25, 1973

Inventor(s) William J. Hazell

It is certified that error appears in the above-identified patent and that said Letters Patent are hereby corrected as shown below:

Cancel the original columns 3 through 6 and substitute in their place the corrected columns, as shown on the attached sheet.

Signed and sealed this 19th day of November 1974.

(SEAL)
Attest:

McCOY M. GIBSON JR.          C. MARSHALL DANN
Attesting Officer            Commissioner of Patents The pneumatic circuit shown in FIG. 1 includes piping 34 which communicates with the vertical conduits 28, 32 at 36 and 38 respectively. A blower 39 is bi-directional and may be operated to create a positive pressure in either of the vertical conduits 28, 32.

A capsule 40 is in a position to receive the information container 10 at the opening 26. Another capsule 42 is disposed at the lowermost point of the vertical conduit 32. Both capsules 40, 42 may be slidably positioned on rods (not shown) which pass through the aforementioned guide holes 24 to prevent the capsules 40, 42 from rotating in the conduits 28, 32. As depicted in FIG. 1 the blower is operating such that a positive pressure is produced in vertical conduit 28. The capsule 40 is held in a position to receive the information container 10 by a pair of detents 46. The pneumatic fluid, normally air, is passing through the cylindrical aperture 20 and consequently the capsule 40 is maintained at the top of the vertical conduit 28.

When the information container 10 is slid rightwardly into the receiving aperture 18 the cylindrical aperture 20 is blocked and a positive pressure now acts on the capsule 40 and information container 10 assembly. That pressure tends to force the assembly downwardly in the conduit 28. The detents 46 may be spring biased and thus overcome merely by the pneumatic pressure or they can be operated by a suitable mechanism which responds to the insertion of the information container 10. The pneumatic pressure carries the assembly of the capsule 40 and the information container 10 to the bottom of the conduit 28 as shown in dotted in FIG. 1. From this position at the bottom of vertical conduit 28 the pneumatic fluid passes through a by-pass conduit 48 to act horizontally rightwardly on the information container 10.

As a result of the horizontal pressure the information container 10 is transported rightwardly through the horizontal conduit 30 until it is received in the receiving aperture 18 present in capsule 42. Prior to receipt of the information container 10 the air flow through the capsule 42 has been through the receiving aperture 18 and out the top of the vertical cylindrical aperture 20. Now that the information container 10 is present within the receiving aperture 18 that conduit is blocked and the air pressure acts through a by-pass 50 on the underside of the information carrier 10. In consequence of this vertical pressure the assembly consisting of the information carrier 10 and the capsule 42 rises vertically in the vertical conduit 32 past the detents 52 and into the position shown in dotted in the vertical conduit 32. At this point the teller may withdraw the information container 10 through an aperture 54 formed in the vertical conduit 32.

To return the information carrier 10 to the original position the teller merely reverses the direction in which the blower 39 is acting by a suitable switch (not shown) such that a positive pressure is present at the top of vertical chamber 32. The information container then returns to its original position by reversing its course from that described above. During the reverse path sequence a by-pass 56 communicating with the vertical conduit 32 is provided to force the information container 10 leftwardly through the horizontal conduit 30 in the same manner that by-pass 48 was utilized previously. Likewise a by-pass 58 communicating with a vertical conduit 28 operates to lift the assembly to its initial position in the same manner that the by-pass 50 operated previously.

Although the capsules 40, 42 have been illustrated as being cylindrical it is readily apparent that other shapes may be used as well. In fact if a multi-sided shape such as a square, pentagon or the like were used there would be no necessity for guide rods.

In many situations it is highly desirable to transfer an information container from one delivery conduit to another without the need for manual transfer. A transfer station which may be automatically operated is indicated generally at 57 in FIG. 5. A vertical conduit 58 includes pipes 59 and 60 for permitting the passage of pneumatic fluid. A plurality of delivery conduits 61, 63 communicate with the vertical conduit 58. A capsule 62 is disposed within the vertical conduit 58. The capsule 62 includes a centrally disposed axial hole 64 which permits the passage of pneumatic fluid when the horizontal receiving apertures 66 do not contain an information container. A plurality of detents 68 are disposed along the vertical conduit 58 to limit the upward motion of the capsule 62.

In operation the transfer station would receive an incoming information container in one of the receiving apertures 66. A positive pneumatic pressure would be acting through the lowermost pipe 59 to raise the capsule 62 and information container assembly upwardly until it abuts one of the detents 68 which has been inserted into the vertical chamber 58. The notches 69 formed on the lower portion of the lefthand side of the receiving apertures 66 permit the pneumatic fluid to circulate behind the information container and force it out into the appropriate delivery conduit 61.

FIGS. 6a-c illustrate an intermediate station for receiving and removing an information container from a main delivery conduit. In FIG. 6a the main delivery conduit is illustrated at 70 in communication with a vertical conduit 72. A capsule 74 is disposed within the vertical conduit 72. A withdrawal station 76 communicates with the vertical conduit 72 and with the main line 70 through a conduit 78 and a valve 80. Another conduit 82 communicates with both ends of the vertical chamber 72 at 84 and 86 and with the atmosphere at 88 and 90. A pair of valves 92 and 94 control the flow of pneumatic fluid through the conduit 82 and the vertical conduit 72.

The capsule 74 includes an axial aperture 96, a rectangular open-ended aperture 98 and a rectangular closed-end aperture 100 which communicates with the axial aperture 96.

As shown in FIG. 6a the high pressure side of the main line 70 is on the left of the vertical conduit 72 such that an information container passing through the main line 70 would move from the left to right. Valve 94 is opened to the atmosphere and the valve 92 is closed to the atmosphere such that a positive pressure is maintained on the underside of the capsule 74. In this condition the opened ended aperture 98 is aligned with the main line 70 and an information carrier travelling therein would simply pass through the capsule 74.

If it is desired to transmit an information container to the intermediate station, valve 94 is closed to the atmosphere such that equal pressures are present on the top and bottom of the capsule 74 allowing it to drop to the position shown in FIG. 6b. At this point the closed end receiving aperture 100 communicates with the main line 70 and can receive an information container as shown in FIG. 6b.

To retrieve the information container valve 92 is opened to the atmosphere and valve 80 is opened to cause the capsule 74 to drop to the bottom of the vertical conduit 72 and force the information container out of the capsule 74 into the withdrawal station 76 as shown in FIG. 6c.

In many applications it is desirable to rotate an information container such that it turns a corner. In FIG. 7 a delivery conduit 102, communicates with a housing 104 and a second delivery conduit 106. The delivery conduits 102, 106 are disposed at right angles to one another. A capsule 108 is rotatably mounted within the housing 104. The capsule 108 includes two rectangular apertures 110 and 112 which communicate with one another and four circular apertures 114a–d.

When there is no information container in the rectangular receiving aperture 112 the air flow passes from the delivery conduit 102 into the receiving chamber 112 out receiving chamber 110 into delivery conduit 106. However, when an information container arrives at the receiving aperture 112 the path of pneumatic fluid flow is blocked. Consequently, the air flow passes downwardly as shown in FIG. 7 into a space between the housing 104 and the rotatable capsule 108 indicated at 116 and produces a positive pressure acting through the circular aperture 114b and rectangular aperture 110. The positive pressure present at 114b causes the capsule 108 to rotate into a position where the information container will be aligned with the delivery conduit 106. At that point the information container will continue in delivery conduit 106.

What is claimed is:

1. A pneumatic transport system comprising:
    a first conduit;
    a second conduit communicating with said first conduit;
    means for creating a pressure differential in said conduits;
    a capsule disposed within said first conduit for movement between a dispatch station and said second conduit;
    said capsule including means for receiving an information container at said dispatch station and conduit means in said capsule for causing said pressure differential to act on said capsule when said information container is placed in said capsule at said dispatch station for moving said capsule and said information container to said second conduit; and
    means for causing said pressure differential to act on said information container at said second conduit for moving said information container out of said capsule for transport through said second conduit.

2. A pneumatic delivery system comprising:
    first and second conduits each of which includes an opening for dispatching and withdrawing an information container;
    a third conduit angularly communicating with said first and second conduits;
    means for creating pneumatic pressure in said conduits;
    first and second capsules disposed in said first and second conduits respectively for movement between said first and second openings and said third conduit;
    said capsules including means for receiving said information container and conduit means for causing said pressure to act on said capsule when said information container is disposed in said receiving means whereby an information container may be dispatched in said first capsule at said first opening to be transported with said first capsule to said third conduit, through said third conduit to said second capsule and thereafter with said second capsule to said second opening for withdrawal from said second opening.

3. An intermediate station for use in a pneumatic delivery system comprising:
    a conduit communicating with a delivery conduit of said system;
    a capsule disposed within said conduit including means for permitting the passage of an information container through said capsule as said container travels in said delivery conduit and means in said capsule for receiving an information container travelling in said delivery conduit for delivery to said intermediate station.

4. The station set forth in claim 3 further comprising:
    conduit means communicating with said conduit and said delivery conduit for pneumatically moving said capsule in said conduit.

5. A transfer device for transferring information containers from one pneumatic delivery line to another which comprises:
    a transfer conduit;
    a plurality of delivery conduits communicating with said transfer conduit;
    a capsule disposed within said transfer conduit, said capsule including means for receiving an information container and conduit means for causing pneumatic pressure to act on said capsule when said information container is disposed in said receiving means; and
    means for moving said capsule such that said receiving means may be selectively disposed in communication with said delivery conduits to transfer an information container from one delivery conduit to another.

* * * * *